United States Patent
McEwan

(10) Patent No.: US 6,386,520 B2
(45) Date of Patent: May 14, 2002

(54) FLUID INLET DEVICE

(75) Inventor: Malcolm William McEwan, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/757,883

(22) Filed: Jan. 10, 2001

(30) Foreign Application Priority Data

Feb. 16, 2000 (EP) .............................................. 00200518

(51) Int. Cl.$^7$ ................................................ B01F 3/04
(52) U.S. Cl. ................................ 261/114.1; 261/114.2; 261/114.3
(58) Field of Search ........................... 261/114.1–114.5; 202/158

(56) References Cited

U.S. PATENT DOCUMENTS

| | | | | |
|---|---|---|---|---|
| 2,150,498 A | * | 3/1939 | Geddes et al. ......... | 261/114.2 X |
| 2,651,512 A | * | 9/1953 | Voleau ................... | 261/114.1 |
| 2,737,377 A | * | 3/1956 | Huggins et al. ......... | 261/114.3 |
| 2,787,453 A | * | 4/1957 | Hibshman et al. ....... | 261/114.3 |
| 3,045,989 A | * | 7/1962 | Kittel ................... | 261/114.1 X |
| 3,062,517 A | * | 11/1962 | Voetter et al. ......... | 261/114.1 X |
| 3,105,105 A | * | 9/1963 | Kittel ................... | 261/114.1 X |
| 3,233,879 A | * | 2/1966 | Mitchell ............... | 261/114.3 X |
| 3,338,566 A | * | 8/1967 | Kittell ................. | 261/114.1 X |
| 3,729,179 A | * | 4/1973 | Keller ................... | 261/114.1 |
| 3,892,825 A | * | 7/1975 | Nazzer ................... | 261/114.1 |
| 3,937,769 A | * | 2/1976 | Strigle, Jr. et al. .... | 261/114.1 X |
| 4,036,918 A | * | 7/1977 | Morgan et al. ......... | 202/158 X |
| 4,159,291 A | * | 6/1979 | Bruckert et al. ........ | 202/158 X |
| 4,238,426 A | * | 12/1980 | Slobodyanik ............ | 261/114.3 |
| 4,311,564 A | * | 1/1982 | Aldridge ............... | 261/114.1 X |
| 4,415,508 A | * | 11/1983 | Aida et al. ............. | 261/114.2 X |
| 4,550,000 A | * | 10/1985 | Bentham ................ | 261/114.1 |
| 4,556,522 A | * | 12/1985 | Wilson .................. | 261/114.1 |
| 4,661,130 A | * | 4/1987 | Ebeling et al. ........ | 261/114.2 X |
| 4,782,857 A | * | 11/1988 | Bieri ..................... | 137/561 A |
| 5,244,604 A | * | 9/1993 | Miller et al. ........... | 261/114.1 X |

FOREIGN PATENT DOCUMENTS

| | | | | |
|---|---|---|---|---|
| DE | 1519711 | | 7/1970 | |
| EP | 0231841 A1 | | 8/1987 | |
| GB | 1119699 | * | 7/1968 | .............. 261/114.1 |
| GB | 1416731 | * | 12/1975 | .............. 261/114.1 |

* cited by examiner

Primary Examiner—Richard L. Chiesa

(57) ABSTRACT

A fluid inlet device for introducing a mixture of liquid and gas into a column provided with an inlet nozzle and with a horizontal gas/liquid contact tray arranged in the column below the inlet nozzle provided with a number of elongated downcomers between which bubbling areas are located, which inlet device consists of an inlet end that is in fluid communication with the inlet nozzle and a number of vertical vanes placed one behind the other, wherein each vane consists of two interconnected parts, an intercepting part and an outwardly directed deflecting part, wherein the intercepting part extends to the inlet end of the inlet device, and wherein an outlet channel defined by the deflecting parts of two adjacent vanes opens above a bubbling area of the contact tray.

4 Claims, 1 Drawing Sheet

FLUID INLET DEVICE

FIELD OF THE INVENTION

The present invention relates to a fluid inlet device for introducing a mixture of liquid and gas into a column. Such a column is any column in which gas and liquid are counter-currently contacted to exchange heat or matter. An example of such a column is a fractionation column and a further example is a vacuum distillation column. In such a column liquid flows, during normal operation, downwards from top to bottom, whereas gas flows upwards from bottom to top. In the specification and in the claims the word 'gas' is used to refer to gas and to vapour.

BACKGROUND OF THE INVENTION

British patent specification No. 1 119 699 discloses a fluid inlet device for introducing a mixture of liquid and gas into a column provided with an inlet nozzle and a gas/liquid contacting tray arranged below the inlet nozzle.

The known fluid inlet device comprises an inlet device having an inlet end that is in fluid communication with the inlet nozzle of the column, and which inlet device comprises a number of evenly spaced vertical vanes placed one behind the other in the column between a top plate and a bottom plate, wherein each vane comprises an outwardly directed deflecting part.

During normal operation a mixture of gas and liquid is supplied to the inlet nozzle of the column. This mixture then flows through the inlet end into the inlet device. The vanes, arranged on either side of a flow path from the inlet end, deflect the mixture outwardly. The change in the direction of flow causes a first gas-liquid separation. The gas flows upwards in the column, where further contacting with liquid supplied to the top of the column takes place, and the separated liquid falls downwards on the gas/liquid contact tray below the inlet device. On the gas/liquid contact tray, the liquid is contacted with gas flowing upwards from the bottom of the column through the perforations in the tray in order to exchange heat and matter with the gas. This contacting takes place on the bubbling area of the gas/liquid contact tray, which is the area of the tray provided with perforations.

In the known inlet device, the vanes are placed at regular intervals. As a result of this arrangement a uniform distribution of liquid over the gas/liquid contact tray under the inlet device is obtained.

For this reason the known inlet device can be used successfully with a conventional gas/liquid contact tray, such as a counter-current tray without a downcomer or a cross-flow tray having a single downcomer at one side of the tray. In a counter-current tray without a downcomer the bubbling area or active area extends over the entire area of the tray, and in a cross-flow tray the bubbling area extends up to the downcomer.

However, there is a trend to use, in stead of a single-downcomer tray, a gas/liquid contact tray with more than one downcomer. Such a multi-downcomer tray is provided with elongated downcomers arranged parallel to each other, wherein the bubbling area is defined between adjacent elongated downcomers.

When the known inlet device is used in combination with such a multi-downcomer tray, not all liquid will fall on the bubbling area. And thus the efficiency of the gas/liquid contact tray is reduced.

It is an object of the present invention to provide a fluid inlet device that can be used in combination with a multi-downcomer tray.

SUMMARY OF THE INVENTION

To this end the fluid inlet device for introducing a mixture of liquid and gas into a column provided with an inlet nozzle and with a horizontal gas/liquid contact tray arranged in the column below the inlet nozzle provided with a number of elongated downcomers between which bubbling areas are located, according to the present invention comprises an inlet end that is in fluid communication with the inlet nozzle of the column, a number of vertical vanes placed one behind the other in the column between a top plate and a bottom plate, wherein each vane comprises two interconnected parts, an intercepting part and an outwardly directed deflecting part, wherein the intercepting part extends to the inlet end of the inlet device, and wherein an outlet channel defined by the deflecting parts of two adjacent vanes opens above a bubbling area of the contact tray.

BRIEF DESCRIPTION OF THE DRAWINGS

The invention will now be described in more detail by way of example with reference to the accompanying drawings, wherein.

DETAILED DESCRIPTION OF THE INVENTION

Figure 1:
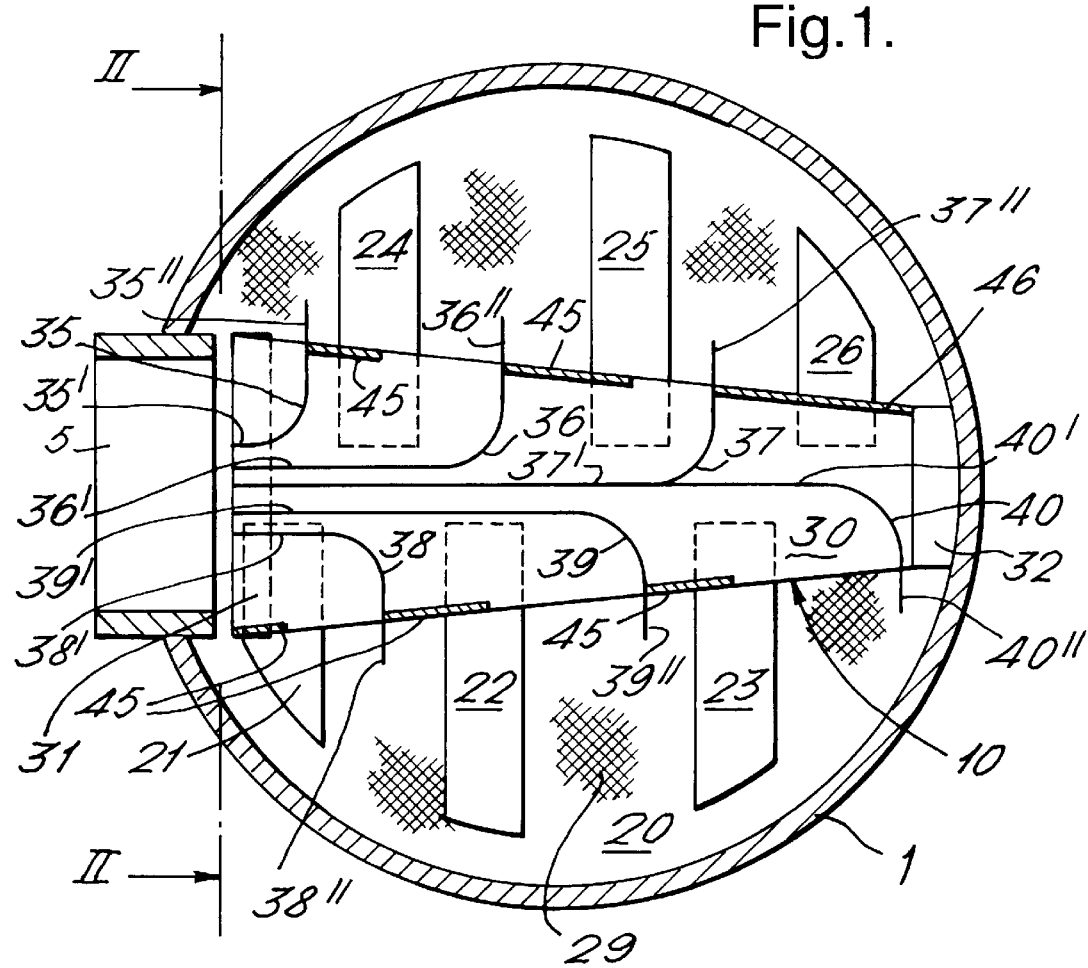
FIG. 1 shows a horizontal section of a column provided with the fluid inlet device according to the present invention.

In FIG. 1 the wall of the column is referred to with reference numeral 1, the inlet nozzle of the column is referred to with reference numeral 5, and the fluid inlet device according to the present invention with reference numeral 10.

The column 1 is provided with a multi-downcomer gas/liquid contacting tray 20 located below the inlet nozzle 5. The contacting tray 20 comprises a perforated plate provided with six parallel elongated downcomers 21, 22, 23, 24, 25 and 26 between which bubbling areas 29 are located. For the sake of clarity only patches of the bubbling areas 29 are hatched.

The fluid inlet device according to the present invention 10 comprises a top plate (not shown) and a bottom plate 30. The device 10 has a square inlet end 31. The device 10 is supported at its inlet end and at the opposite end by means of supports that are secured to the wall 1 of the column. The support at the opposite end of the device 10 is referred to with reference numeral 32.

The device 10 further comprises a number of vertical vanes 35, 36, 37, 38, 39 and 40 placed one behind the other in the column between the top plate and the bottom plate 30. Each vane 35, 36, 37, 38, 39 and 40 comprises two interconnected parts, an intercepting part 35', 36', 37', 38', 39' and 40' and an outwardly directed deflecting part 35", 36", 37", 38", 39" and 40".

The intercepting parts 35', 36', 37', 38', 39' and 40' extend to the inlet end 31 of the inlet device 10. In the embodiment shown in FIG. 1 the upstream end of the intercepting part 40' coincides with the intercepting part 37'.

Furthermore, the outwardly directed deflecting parts 35", 36", 37", 38", 39" and 40" are so positioned that an outlet channel defined by the deflecting parts of two adjacent vanes opens above the bubbling area 29 of the contact tray 20 between two adjacent downcomers 21, 22 and 22, 23 and 24, 25 and 25, 26.

During normal operation a mixture of gas and liquid is supplied to the inlet nozzle 5 of the column. This mixture then flows through the inlet end 31 into the inlet device 10. The vanes 35, 36, 37, 38, 39 and 40, arranged on either side of a flow path from the inlet end 31, deflect the mixture outwardly. The change in the direction of flow causes a first gas-liquid separation. The gas flows upwards in the column, where further contacting takes place, and the separated liquid falls downwards on the gas/liquid contact tray 20 arranged below the device 10. On the bubbling area 29 of the gas/liquid contact tray 20, the liquid is contacted with gas flowing upwards from the bottom of the column in order to exchange heat and matter with the gas. After the contacting, the liquid flows through the downcomers 21, 22, 23, 24, 25 and 26 to a tray arranged below gas/liquid contacting tray 20.

Because the outwardly directed deflecting parts 35", 36", 37", 38", 39" and 40" are so positioned that outlet channels defined by the deflecting parts of adjacent vanes open above the bubbling area 29 of the contact tray 20 between two adjacent downcomers 21, 22 and 22, 23 and 24, 25 and 25, 26, the liquid falls on the bubbling area and not in the downcomers.

Figure 2:
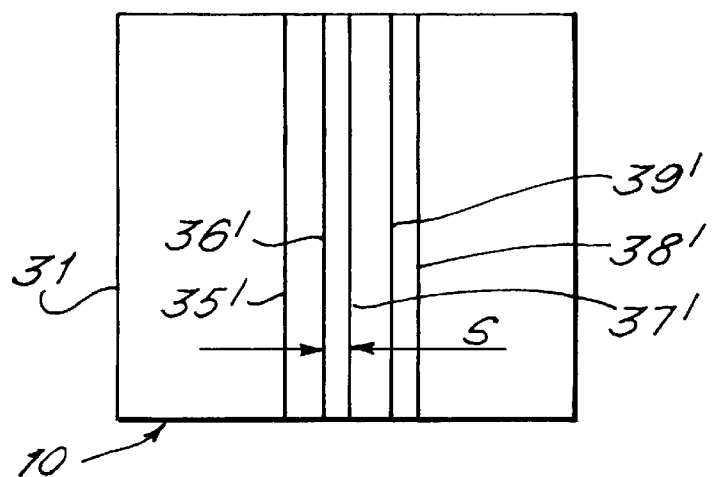
FIG. 2 shows a sectional view of FIG. 1 in the direction II—II, drawn to a different scale.

Furthermore, the intercepting parts 35', 36', 37', 38', 39' and 40' extend to the inlet end 31 of the inlet device 10. This feature allows distributing the amount of fluid that is supplied to the vanes 35 and 38 and through the channels defined by the adjacent vanes 35 and 36, 36 and 37, 38 and 39, and 39 and 40, by selecting the horizontal spacing between the intercepting parts 35', 36', 37', 38' and 39' at the inlet end 31 of the device 10. In FIG. 2 the horizontal spacing between the intercepting parts 36' and 37' is indicated with the letter s. An advantage is that now the amount of liquid that is delivered can be controlled.

In order to restrict the outlet channel defined by the deflecting parts of two adjacent vanes, the upstream part of an outlet channel is suitably closed by a vertical baffle 45. The use of a baffle 45 allows a uniform spacing of the vanes.

The dead zone downstream of the vane 37 can be closed by a cover 46, which cover 46 further serves to strengthen the opposite end of the fluid inlet device 10.

The device discussed with reference to FIG. 1 the downcomers at either side of the inlet device are staggered with respect to each other. In an alternative embodiment the downcomers at either side of the inlet device are in line with each other, or each downcomer extends under the inlet device.

Suitably the number of vanes is in the range of from 4 to 20.

I claim:

1. A fluid inlet device for introducing a mixture of liquid and gas into a column, said device comprising:

an inlet nozzle;

a horizontal gas/liquid contact tray arranged in the column below the inlet nozzle comprising a number of elongated downcomers having bubbling areas situated between said downcomers;

an inlet end in fluid communication with the inlet nozzle and possessing a number of vertical vanes situated one behind the other between a top plate and a bottom plate, wherein each such vane comprises two interconnected parts comprising an intercepting part and an outwardly directed deflecting part, wherein the intercepting part extends to the inlet end of the inlet device, and wherein an outlet channel defined by the deflecting parts of two adjacent vanes discharges above a bubbling area of the contact tray.

2. The fluid inlet device of claim 1, in which the upstream part of an outlet channel is closed by a vertical baffle.

3. The fluid inlet device of claim 1, in which the inlet end is square.

4. The fluid inlet device of claim 1, in which the number of vanes is in the range of from 4 to 20.

* * * * *